US011350157B2

(12) United States Patent
Golyshko (10) Patent No.: US 11,350,157 B2
(45) Date of Patent: May 31, 2022

(54) SYSTEMS AND METHODS FOR DELAYED PAUSING

(71) Applicant: Rovi Guides, Inc., San Jose, CA (US)

(72) Inventor: Phil Golyshko, Westminster, CO (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/838,376

(22) Filed: Apr. 2, 2020

(65) Prior Publication Data

US 2021/0314654 A1 Oct. 7, 2021

(51) Int. Cl.
*H04N 21/433* (2011.01)
*H04N 21/2387* (2011.01)
*H04N 21/458* (2011.01)
*H04N 21/4627* (2011.01)
*H04N 21/472* (2011.01)
*H04N 21/84* (2011.01)
*H04N 21/81* (2011.01)
*H04N 21/488* (2011.01)
*H04N 21/845* (2011.01)

(52) U.S. Cl.
CPC ..... *H04N 21/4333* (2013.01); *H04N 21/2387* (2013.01); *H04N 21/458* (2013.01); *H04N 21/4627* (2013.01); *H04N 21/47217* (2013.01); *H04N 21/4882* (2013.01); *H04N 21/812* (2013.01); *H04N 21/84* (2013.01); *H04N 21/8456* (2013.01)

(58) Field of Classification Search
None
See application file for complete search history.

(56) References Cited

U.S. PATENT DOCUMENTS

| 6,006,257 | A  | * | 12/1999 | Slezak ................. H04H 20/103 348/E7.071 |
| 6,771,887 | B1 |   | 8/2004 | Okawa et al. |
| 7,079,176 | B1 |   | 7/2006 | Freeman et al. |
| 7,761,892 | B2 | * | 7/2010 | Ellis .................. H04N 21/2353 725/86 |
| 8,479,046 | B1 | * | 7/2013 | Bailey ................. G06F 11/1088 714/48 |
| 9,414,119 | B2 |   | 8/2016 | Casement et al. |
| 9,436,416 | B2 | * | 9/2016 | Yu .......................... G06F 3/1203 |
| 9,479,836 | B2 |   | 10/2016 | Adimatyam et al. |
| 9,948,966 | B1 | * | 4/2018 | Panchaksharaiah ........................ H04N 21/44222 |
| 10,057,630 | B1 | * | 8/2018 | Panchaksharaiah .... G11B 27/11 |
| 2002/0144262 | A1 | * | 10/2002 | Plotnick ............... H04N 21/252 725/32 |
| 2002/0174430 | A1 |   | 11/2002 | Ellis et al. |

(Continued)

FOREIGN PATENT DOCUMENTS

EP 3118772 A1 1/2017
JP 2008289194 A 11/2008

OTHER PUBLICATIONS

U.S. Appl. No. 16/838,369, filed Apr. 2, 2020, Phil Golyshko.

*Primary Examiner* — An Son P Huynh
(74) *Attorney, Agent, or Firm* — Haley Guiliano LLP (57) ABSTRACT

Systems and methods are provided herein for delaying pause of the play of a media asset. This may be accomplished by a device receiving a command from a user to pause play of a media asset. The device may, in response to determining that the command was received during a sequence of action or a sequence of dialog, delay the pausing of the play of the media asset until the sequence has completed.

16 Claims, 11 Drawing Sheets

(56) References Cited

U.S. PATENT DOCUMENTS

| | | |
|---|---|---|
| 2004/0133909 A1 | 7/2004 | Ma |
| 2005/0060745 A1* | 3/2005 | Riedl ............... H04N 21/44222 |
| | | 725/42 |
| 2005/0188408 A1 | 8/2005 | Wallis et al. |
| 2007/0237492 A1 | 10/2007 | Roberts et al. |
| 2010/0153885 A1 | 6/2010 | Yates |
| 2011/0075994 A1* | 3/2011 | Hsiung ................ G11B 27/005 |
| | | 386/330 |
| 2011/0145856 A1* | 6/2011 | Agarwal ............ H04N 21/6581 |
| | | 725/32 |
| 2012/0072960 A1 | 3/2012 | Rosenberg et al. |
| 2013/0321648 A1* | 12/2013 | Tamiya .............. H04N 5/23222 |
| | | 348/207.1 |
| 2013/0347047 A1 | 12/2013 | Tanaka |
| 2014/0152806 A1 | 6/2014 | Hauk |
| 2015/0192939 A1 | 7/2015 | Joo et al. |
| 2015/0242068 A1 | 8/2015 | Losey et al. |
| 2015/0256796 A1* | 9/2015 | Ma ...................... H04L 12/1822 |
| | | 709/206 |
| 2016/0042079 A1 | 2/2016 | Johnson et al. |
| 2016/0282816 A1 | 9/2016 | Zhu |
| 2017/0195746 A1* | 7/2017 | Gupta ............... H04N 21/47217 |
| 2017/0339234 A1* | 11/2017 | Vajravel ................ H04L 67/145 |
| 2017/0374315 A1* | 12/2017 | Ma ......................... H04L 51/04 |
| 2018/0082340 A1 | 3/2018 | Freund et al. |
| 2019/0132639 A1* | 5/2019 | Panchaksharaiah ......................... |
| | | H04N 21/2387 |
| 2019/0166412 A1 | 5/2019 | Panchaksharaiah et al. |

* cited by examiner

SYSTEMS AND METHODS FOR DELAYED PAUSING

BACKGROUND

The present disclosure relates to user interfaces and controls, and in particular, to systems and methods for delaying pause of the play of a media asset.

SUMMARY

Whether it is to allow a user to pause a movie to go make popcorn or pause a television show to answer a phone call, being able to pause a media asset has become expected in today's entertainment systems. When a user presses pause, using a remote or a button, current technologies translate the pushed button into a command to be executed on a central processing unit. However, there are many situations where current pausing technologies are wholly inadequate and inconvenient for a user. For example, forced advertisements embedded into media assets are a cornerstone of many streaming services. If the user issues a command (e.g., fast-forward, skip, pause) during forced advertisements, the forced advertisements prohibit the central processing unit from executing the command. This makes the user unable to step away from the media asset without the risk of missing some of the media asset. In another example, a user may wish to pause a movie during the next break in action but is afraid that they will either forget or not know an appropriate time to pause. Due to the technical challenges involved, current pausing techniques lack a dynamic system that can respond to the evolving demands of a user viewing media content.

Accordingly, techniques are disclosed herein for improved systems and methods for delaying pause of play of a media asset. Various embodiments disclosed herein provide for receiving a command from a user to pause play of a media asset. In response to detecting a condition corresponding to a segment of the media asset, the system delays pause of play of the media asset until after the segment is complete. Once the segment has completed, the system pauses the media asset. For example, the media asset may be a television show, such as "Doctor Who," divided into a number of segments, wherein some of the segments can be forced advertisements. When presented with a segment that is a forced advertisement, a user may wish to go make some food (or do some other activity) without missing any "Doctor Who." The user can press pause, and the system detects a condition associated with the forced advertisement segment, wherein the condition does not allow the central processing unit to execute commands during the segment. In response to detecting the condition, the system delays executing the pause command by keeping the pause command in a queue to be executed by the central processing unit after the forced advertisement segment is complete. Once the forced advertisement is complete, the system executes the pause command and pauses "Doctor Who," ensuring that the user does not miss any of the show.

Various disclosed embodiments provide receiving a command from a user to pause a media asset. A determination about whether the command was received during a sequence within the media asset is made, wherein the sequence comprises a sequence of action or a sequence of dialog. In response to the determination that the command was received during a sequence, the system delays the pausing of the play of the media asset until after the sequence is complete. After the sequence is complete, the system will pause the media asset. For example, the media asset may be a movie, such as "The Matrix Revolutions," divided into a number of segments, wherein some of the segments are action scenes. During an action scene, a user may wish to pause the movie during the next break in action but is afraid they will either forget to issue a pause command or not know an appropriate time during the movie to pause. The user can issue a pause command, and the system detects that the command was received during a sequence of action. In response to detecting that the pause command was issued during an action sequence, the system delays executing the pause command by keeping the pause command in a queue to be executed by the central processing unit after the action sequence is complete. Once the action sequence is complete, the system executes the pause command and pauses "The Matrix Revolutions," allowing the user to take a break without interrupting a pivotal action scene and ensuring an optimal viewing experience for the user.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
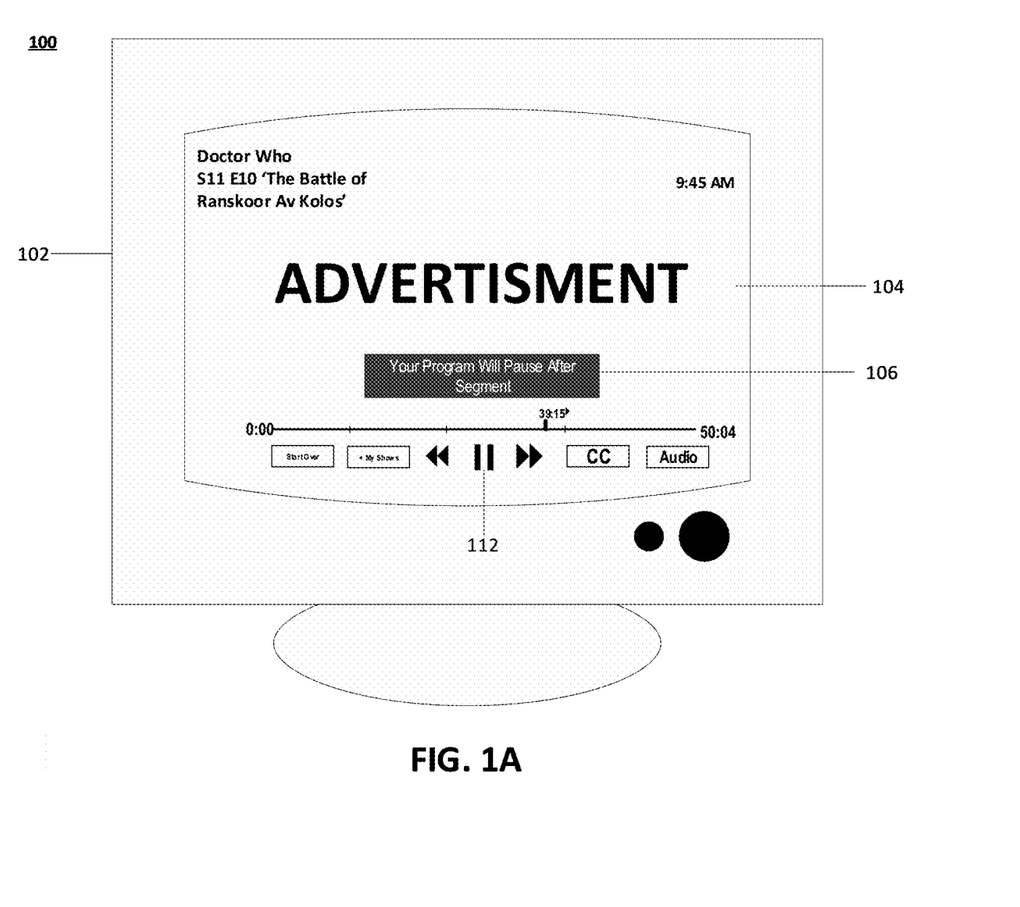
FIGS. 1A-1C show illustrative diagrams of user devices delaying pause of play of a media asset, in accordance with embodiments of the disclosure.

FIG. 1A shows an illustrative diagram 100 of user device 102 delaying pause of play of a media asset, in accordance with embodiments of the disclosure. In this example, a media asset may be playing on a user device 102. Although a television is used in this example a user device may be any device capable of sharing a media asset, such as televisions, laptops, tablets, smartphones, or similar devices capable of playing a media asset. A media asset may be any type of media including television programs, movies, audio books, podcasts, playlists, songs, videos, audio, images or similar content, and any combination thereof. In some embodiments, a media asset includes or is divided into one or more segments. Segments may include advertisements, announcements, instructions, and/or similar such content. In one embodiment, a user device 102 stops playback of a media asset and displays a segment after a time period. In other embodiments, after the media asset has played for a period of time, the user device 102 displays a segment. For example, after a user has been viewing a media asset for ten minutes, the user device 102 will cause a segment to be displayed to the user. In one embodiment, the user device 102 is caused to display a segment by a server or other user device as discussed below. In FIG. 1A a user is viewing the media asset "Doctor Who," when the user device 102 displays a segment.

In this embodiment, the segment is a forced advertisement 104, and during the forced advertisement 104 the user issues a pause command by pressing the pause button 112. In one embodiment, when the user issues a pause command, a user can be presented with a user interface such as shown in FIG. 1C to issue a pause command, e.g., pause after playing a segment. In response to receiving the pause command, the user device 102 detects if there are any conditions associated with the advertisement 104 being played. In this embodiment, the user device 102 detects that the segment is a forced advertisement 104, which prohibits the user device 102 from executing a pause command. In response to detecting the condition, the user device 102 delays the pausing of play of the media asset until after the segment is complete. In this embodiment, after delaying the pause command, the user device 102 displays a message 106 for the user indicating that the media asset will pause after the segment is complete. In an embodiment, once the advertisement 104 has ended, the user device 102 pauses the play of "Doctor Who."

Figure 1B:
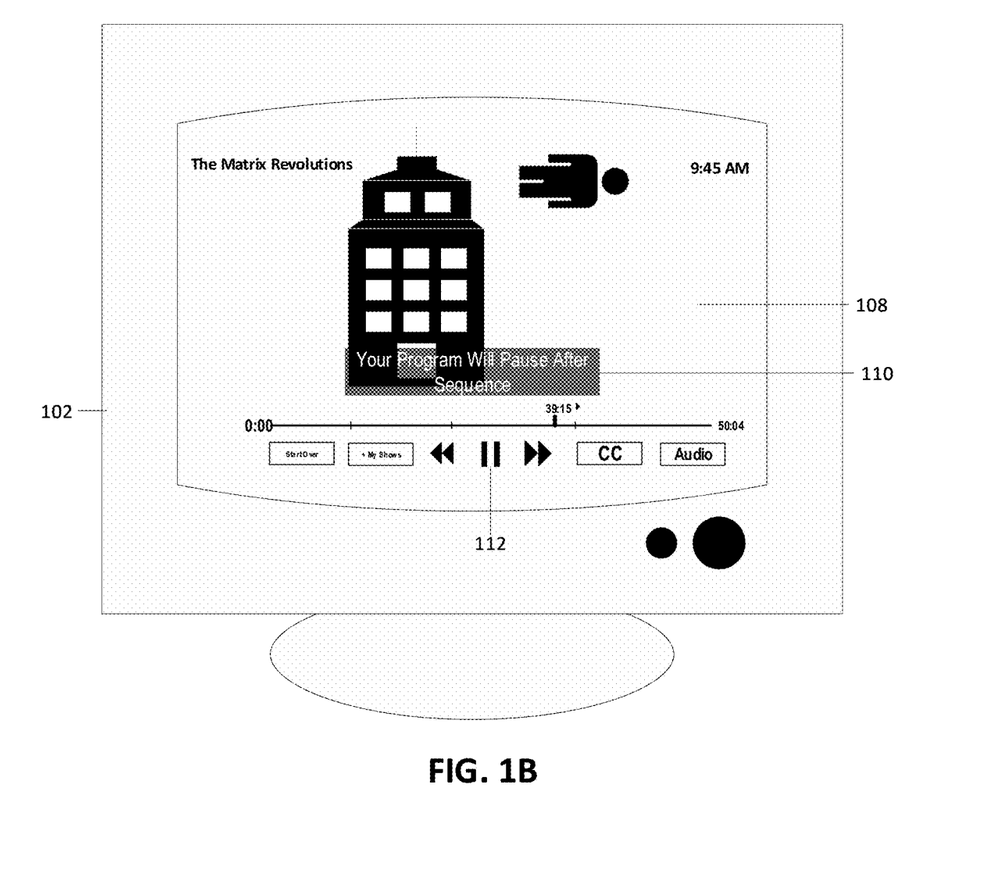
Figure 1C:
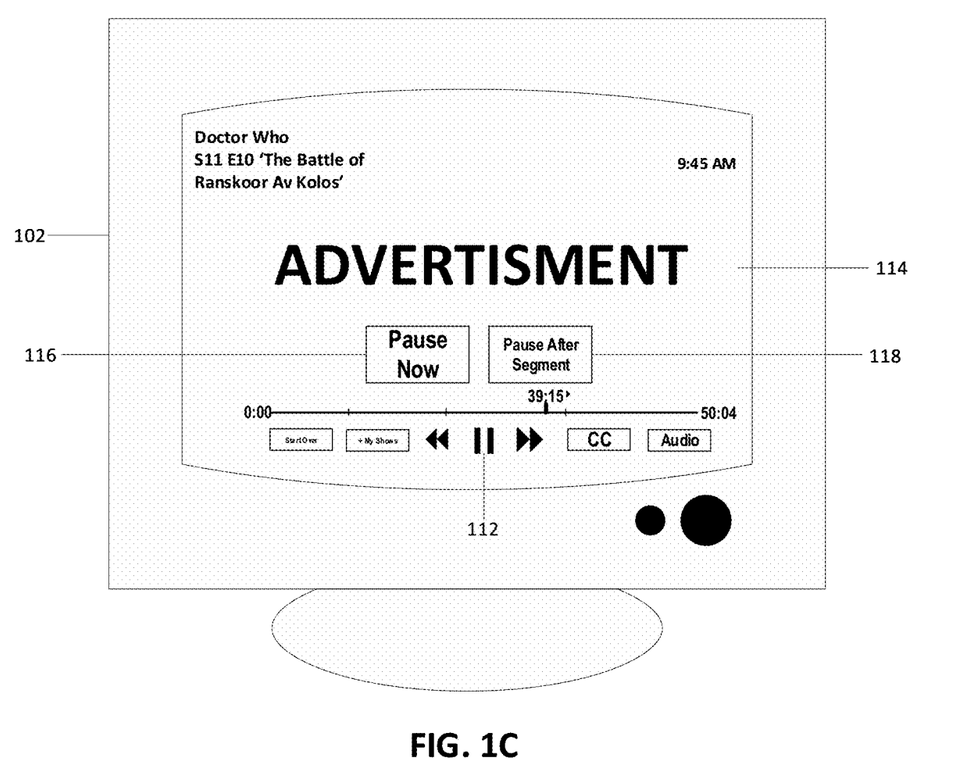

FIG. 1B shows an illustrative diagram of a user device 102 delaying pause of play of a media asset, in accordance with embodiments of the disclosure. In one embodiment, a media asset includes one or more sequences in the media asset, wherein a sequence includes events in the media asset that reveal important plot elements. For example, a sequence could include details of the conclusion of a plot or storyline, plot twists, character deaths, climatic events, dialog, and similar such events. In other embodiments, sequences of a media asset are identified by metadata of the media asset. In some embodiments, sequences of a media asset are identified using trained machine learning models. In an embodiment, the user device 102 is displaying a sequence of a media asset, wherein the media asset is "The Matrix Revolutions" and the sequence is a climatic action scene 108. During the climatic action scene 108 the user device 102 receives a pause command from the user and determines, using metadata associated with the media asset, that the pause command was received during a sequence of action. In response to determining that the command was received during the sequence, the user device 102 delays the pausing of play of the media asset until after the sequence is completed. In some embodiments, after delaying the pause command, the user device 102 displays a message 110 for the user indicating that the media asset will pause after the sequence is complete. In an embodiment, once the climatic action scene 104 has ended, the user device 102 pauses the play of "The Matrix Revolutions."

FIG. 1C shows an illustrative diagram of a user device 102 delaying pause of play of a media asset, in accordance with embodiments of the disclosure. In this embodiment, a user is viewing the media asset "Doctor Who" when the user device 102 displays a segment. In this embodiment, the segment is a forced advertisement 114, and during the forced advertisement 114, the user issues a pause command by pressing the pause button 112. In one embodiment, when the user issues a pause command, a user can be presented with a pause now option 116 and a pause after segment option 118. In an embodiment, if the user selects the pause now option 116, the user device 102 executes the pause command, pausing the segment. In another embodiment, if the user selects the pause after segment option 118, the user device 102 delays the pause of play of the media asset until after the segment is complete. In other embodiments, additional options can be added, for example, an option allowing a user to select a time period indicating how long the pause of play will be delayed (e.g., 45 seconds).

Figure 2:
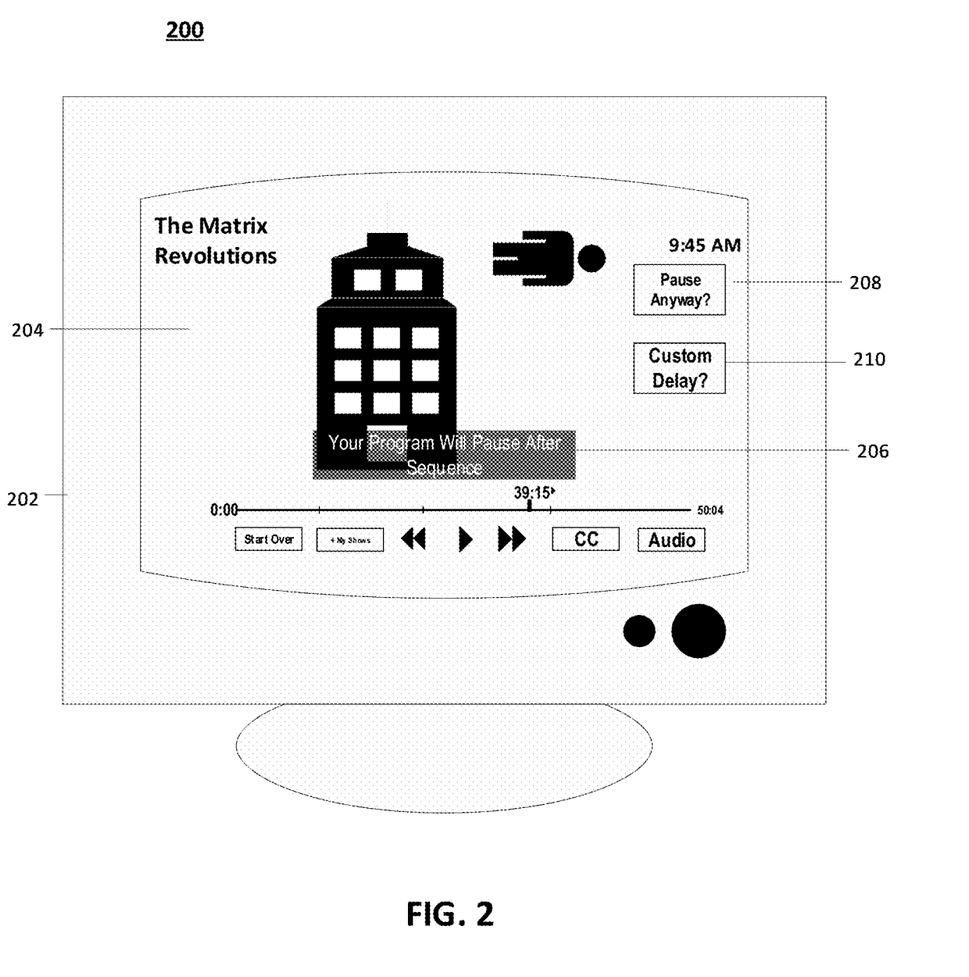
FIG. 2 shows an illustrative diagram of a user device delaying pause of play of a media asset, in accordance with embodiments of the disclosure.

FIG. 2 shows an illustrative diagram 200 of user device 202 delaying pause of play of a media asset, in accordance with embodiments of the disclosure. In an embodiment, the user device 202 is displaying a sequence of a media asset, wherein the media asset is "The Matrix Revolutions" and the sequence is a climatic action scene 204. During the climatic action scene 204, the user device 202 receives a pause command from the user and determines, using metadata associated with the media asset, that the pause command was received during a sequence of action. In response to determining that the command was received during the sequence, the user device 202 delays the pausing of play of the media asset until after the sequence is completed. In some embodiments, after delaying the pause command, the user device 202 displays a message 206 for the user indicating that the media asset will pause after the sequence is complete. In an embodiment, once the climatic action scene 204 has ended, the user device 202 pauses the play of "The Matrix Revolutions." In some embodiments, after delaying the pause command, the user device 202 displays a pause anyway option 208. In an embodiment, the user device 202 allows a user to select the pause anyway option 208 which overrides the delaying of the pause. When the user issues the override command, the user device 202 executes the pause command without delay. In some embodiments, before or after delaying the pause command, the user device 210 displays a custom delay option 210. In an embodiment, when the user selects the custom delay option, the user device 202 allows a user to select a time period indicating how long the pause will be delayed. For example, a user could select the custom delay option 210 and set the time period for delaying the pause to fifteen minutes. The custom delay option 210 may allow a user to delay a pause for any amount of time. In an embodiment, when the user selects the custom delay option, the user device 202 allows a user to select an option for delaying the pause after a type of scene or dialog. For example, the custom delay option 210 may allow a user to delay a pause until after a scene has ended.

Figure 3:
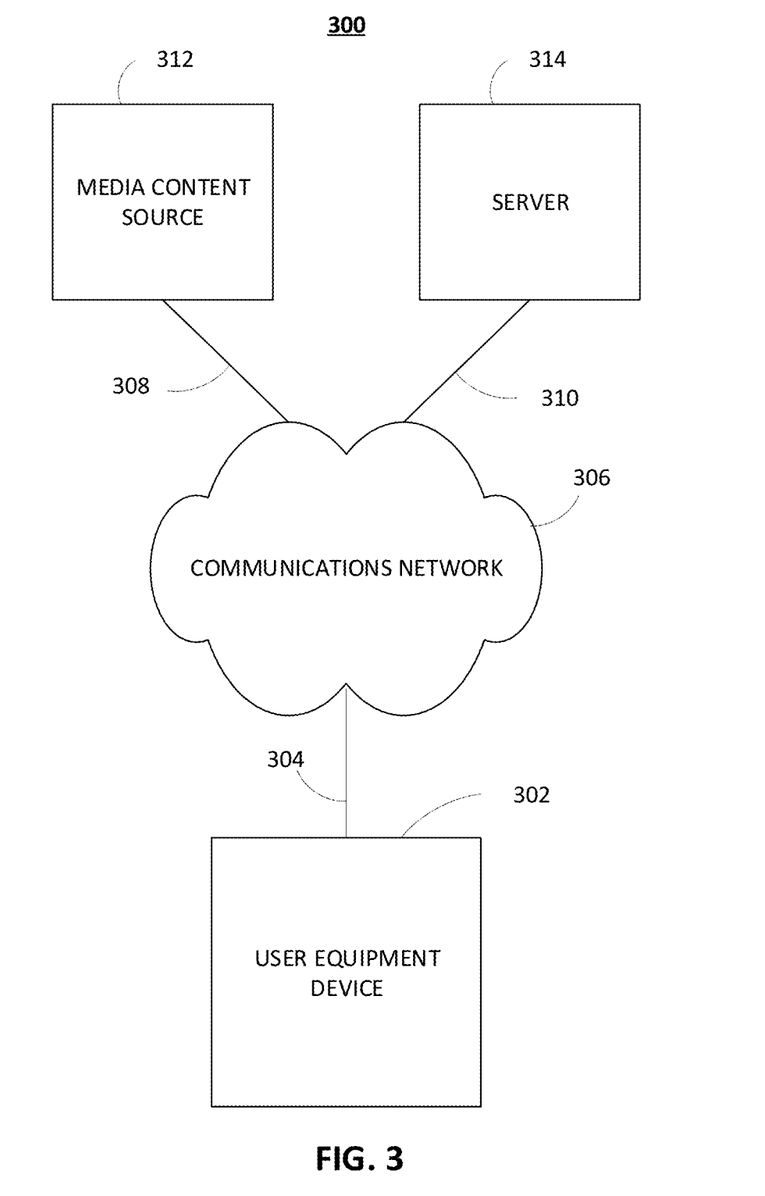
FIG. 3 shows an illustrative block diagram of a user equipment (UE) device system, in accordance with embodiments of the disclosure.
Figure 4:
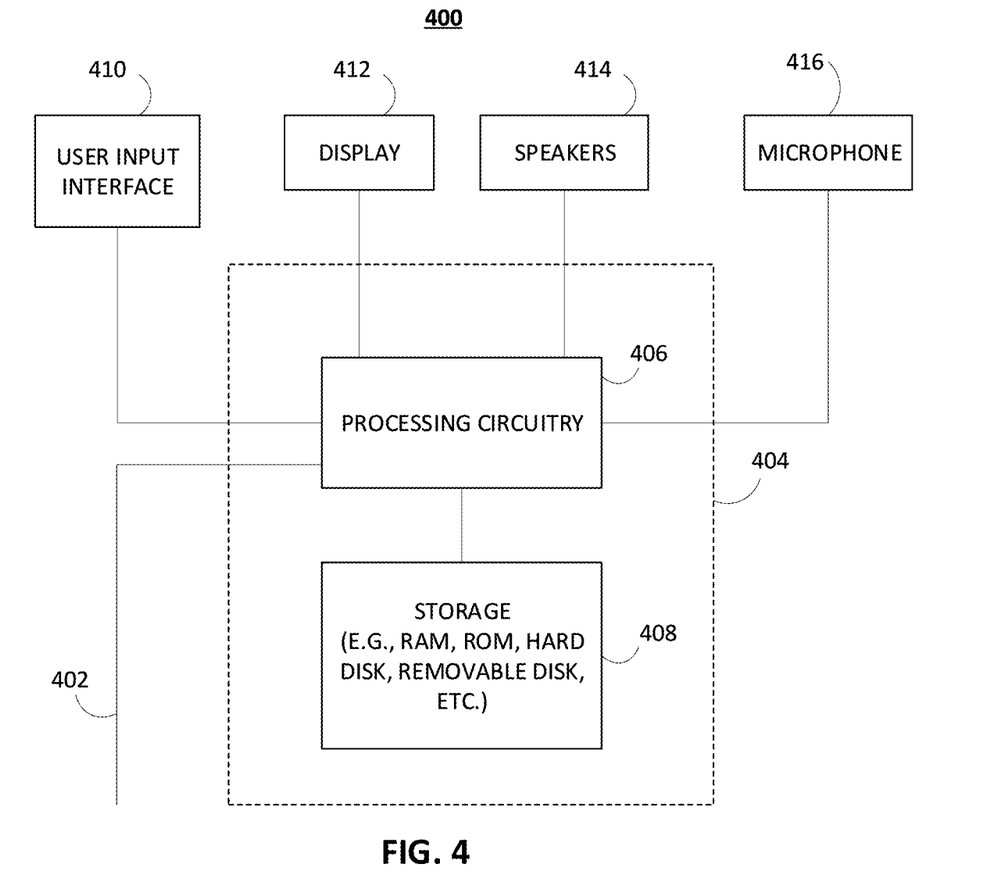
FIG. 4 shows an illustrative block diagram of a media system, in accordance with embodiments of the disclosure.

FIGS. 3-4 describe exemplary devices, systems, servers, and related hardware for delaying pause of play of a media asset, in accordance with one embodiment. In the system 300, there can be more than one user equipment device 302, but only one is shown in FIG. 3 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 306.

The user equipment devices may be coupled to communications network 306. Namely, the user equipment device 302 is coupled to the communications network 306 via communications path 304. The communications network 306 may be one or more networks including the Internet, a mobile phone network, mobile voice or data network (e.g., a 4G or LTE network), cable network, public switched telephone network, or other types of communications network or combinations of communications networks. The path 304 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 304 can be a wireless path. Communications with the user equipment device may be provided by one or more communications paths but is shown as a single path in FIG. 3 to avoid overcomplicating the drawing.

The system 300 also includes media content source 312, and server 314, which can be coupled to any number of databases providing information to the user equipment devices. The media content source 312 represents any computer-accessible source of content, such as a storage for audio content, metadata, or, similar such information. The server 314 may store and execute various software modules for implementing the delaying pause of play functionality. In some embodiments, the user equipment device 302, media content source 312, and server 314 may store metadata associated with a media asset.

FIG. 4 shows a generalized embodiment of a user equipment device 400, in accordance with one embodiment. In an embodiment, the user equipment device 400 is the same user equipment device 302 of FIG. 3. The user equipment device 400 may receive content and data via input/output (hereinafter "I/O") path 402. The I/O path 402 may provide audio content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths. I/O functions may be provided by one or more of these communications paths but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The delay of pause functionality can be at least partially implemented using the control circuitry 404. The delay of pause functionality described herein may be implemented in or supported by any suitable software, hardware, or combination thereof. The delay of pause functionality can be implemented on user equipment, on remote servers, or across both.

In client/server-based embodiments, the control circuitry 404 may include communications circuitry suitable for communicating with one or more servers that may at least implement the described delay of pause functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 408 may be used to store various types of content described herein. Nonvolatile memory may also be used (e.g., to launch a boot-up routine and other instructions). Cloud-based storage, described in relation to FIG. 3, may be used to supplement the storage 408 or instead of the storage 408.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and down converting content into the preferred output format of the user equipment device 400. The control circuitry 404 may also include digital-to-analog converter circuitry and analog-to-digital converter circuitry for converting between digital and analog signals. The tuning and encoding circuitry may be used by the user equipment device 400 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 408 is provided as a separate device from the user equipment device 400, the tuning and encoding circuitry (including multiple tuners) may be associated with the storage 408.

The user may utter instructions to the control circuitry 404, which are received by the microphone 416. The microphone 416 may be any microphone (or microphones)

capable of detecting human speech. The microphone 416 is connected to the processing circuitry 406 to transmit detected voice commands and other speech thereto for processing.

The user equipment device 400 may optionally include an interface 410. The interface 410 may be any suitable user interface, such as a remote control, mouse, trackball, keypad, keyboard, touchscreen, touchpad, stylus input, joystick, or other user input interfaces. A display 412 may be provided as a stand-alone device or integrated with other elements of the user equipment device 400. For example, the display 412 may be a touchscreen or touch-sensitive display. In such circumstances, the interface 410 may be integrated with or combined with the microphone 416. When the interface 410 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 410 may be HDTV-capable. In some embodiments, the display 412 may be a 3D display. The speaker (or speakers) 414 may be provided as integrated with other elements of user equipment device 400 or may be a stand-alone unit.

The user equipment device 400 of FIG. 4 can be implemented in system 300 of FIG. 3 as user equipment device 302, but any other type of user equipment suitable for delaying of pause may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 5:
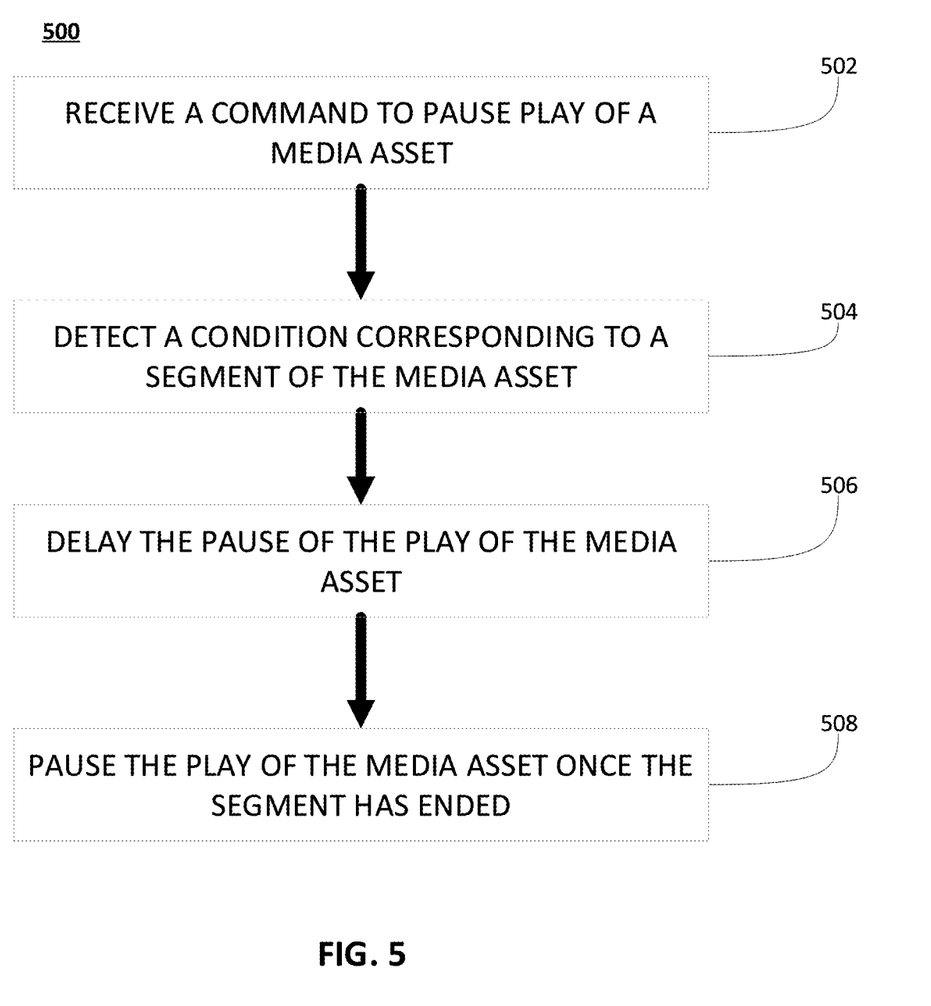
FIG. 5 is an illustrative flowchart of a process for delaying pause of play, in accordance with embodiments of the disclosure.

FIG. 5 is an illustrative flowchart of a process 500 for delaying pause of play of a media asset, in accordance with embodiments of the disclosure. Process 500, and any of the following processes, may be executed by control circuitry 404 on a user equipment device 400. In some embodiments, control circuitry 404 may be part of a remote server separated from the user equipment device 400 by way of a communications network or distributed over a combination of both. In some embodiments, instructions for executing process 500 may be encoded onto a non-transitory storage medium (e.g., the storage 408) as a set of instructions to be decoded and executed by processing circuitry (e.g., the processing circuitry 406). Processing circuitry may, in turn, provide instructions to other sub-circuits contained within control circuitry 404, such as the encoding, decoding, encrypting, decrypting, scaling, analog/digital conversion circuitry, and the like. It should be noted that the process 500, or any step thereof, could be performed on, or provided by, any of the devices shown in FIGS. 1-4. Although the process 500 is illustrated as described as a sequence of steps, it is contemplated that various embodiments of process 500 may be performed in any order or combination and need not include all the illustrated steps.

At 502, the user equipment device 400, by control circuitry 404, receives a command to pause play of a media asset. In some embodiments, the user equipment device 400 receives the command when a user presses pause using a button on a remote or on the user equipment device 400. In some embodiments, a user speaks a command into the microphone 416 of the user equipment device 400, and the user equipment device 400 uses natural language processing methods or similar such techniques to determine a pause command.

At 504, the user equipment device 400, by control circuitry 404, detects a condition corresponding to a segment of the media asset. In some embodiments, the user equipment device 400 uses the process 600 for detecting a condition corresponding to a segment of a media asset shown in FIG. 6.

At 506, the user equipment device 400, by control circuitry 404, delays the pause of play of the media asset based on the detection of a condition in 504. In some embodiments, the user equipment device 400 uses the process 700 for delaying the pause of play of the media asset based on the detection of a condition shown in FIG. 7.

At 508, the user equipment device 400, by control circuitry 404, pauses the play of the media asset once the segment has ended. In an embodiment, the user equipment device 400 executes a pause command in response to detecting that a segment has ended.

Figure 6:
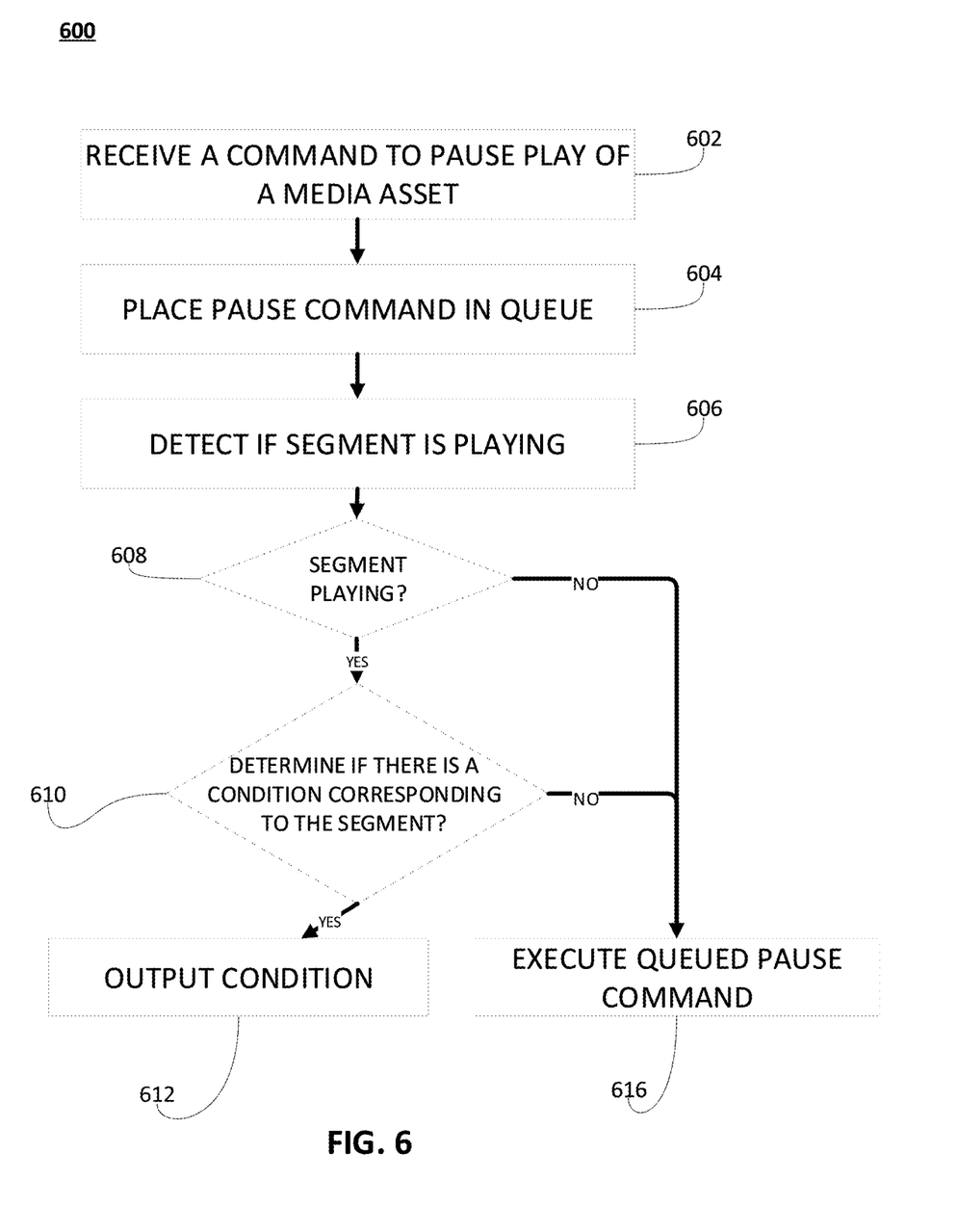
FIG. 6 is an illustrative flowchart of a process for detecting a condition corresponding to a segment of a media asset, in accordance with embodiments of the disclosure.

FIG. 6 is an illustrative flowchart of a process 600 for detecting a condition corresponding to a segment of a media asset, in accordance with embodiments of the disclosure. At 602, the user equipment device 400, by control circuitry 404, receives a command to pause play of a media asset using techniques described above.

At 604, the user equipment device 400, by control circuitry 404, places the received pause command in a queue. In some embodiments, the queue is located in any of the devices described in FIGS. 1-4. For example, the queue may be located in storage 408 of the user device.

At 606, the user equipment device 400, by control circuitry 404, detects if a segment is playing when the command was received by the user equipment device 400. In some embodiments, this detection is made by detecting metadata associated with the content being displayed on the user equipment device 400. In some embodiments, the user equipment device 400 uses pattern recognition techniques to determine if the content being displayed is a segment. In some embodiments, the user equipment device 400 uses a trained machine learning model to determine if the content being displayed is a segment. In some embodiments, the content being displayed may be pre-processed and classified, e.g., using any appropriate data mining classification algorithm (e.g., Naïve Bayes, Stochastic Gradient Descent, K-Nearest Neighbors, Decision Tree, Random Forest, Neural Networks, Support Vector Machine, etc.). For example, a known data mining classification algorithm can be used to classify information relating to the content being displayed on the user equipment device 400. After the information is classified, it may be stored in, e.g., a classified information database.

At 608, the user equipment device 400, by control circuitry 404, determines whether a segment is playing when the command was received by the user equipment device 400, based on the detection in step 606. If no segment is detected, then the user equipment device 400, by control circuitry 404, executes the queued pause command. In an embodiment, the user device 400 determines that no segment is detected, indicating that the media asset is playing, therefore the pause command can be executed. If a segment is detected, then the process 600 continues to 610.

At 610, the user equipment device 400, by control circuitry 404, determines if there is a condition corresponding to the segment. If no condition is detected, then the user equipment device 400, by control circuitry 404, executes the queued pause command. In some embodiments, the user equipment device 400 uses a set of rules located in storage 408 to determine if the segment detected in step 606 corresponds to a condition. In some embodiments, no condition corresponds to the segment. In such an embodiment, the user equipment device 400, by control circuitry 404, executes the queued pause command. In some embodiments, the user equipment device 400 uses a trained machine learning model to determine if there is a condition corresponding to the segment. In some embodiments, the user equipment device 400 uses previous data to determine if there is a condition associated with the detected segment. If a condition is detected, then the process 600 continues to 612.

At 612, the user equipment device 400, by control circuitry 404, outputs a condition associated with the segment. In some embodiments, there may be more than one condition. In an embodiment, a condition may be that the segment is an advertisement.

At 614, the user equipment device 400, by control circuitry 404, executes the queued pause command.

Figure 7:
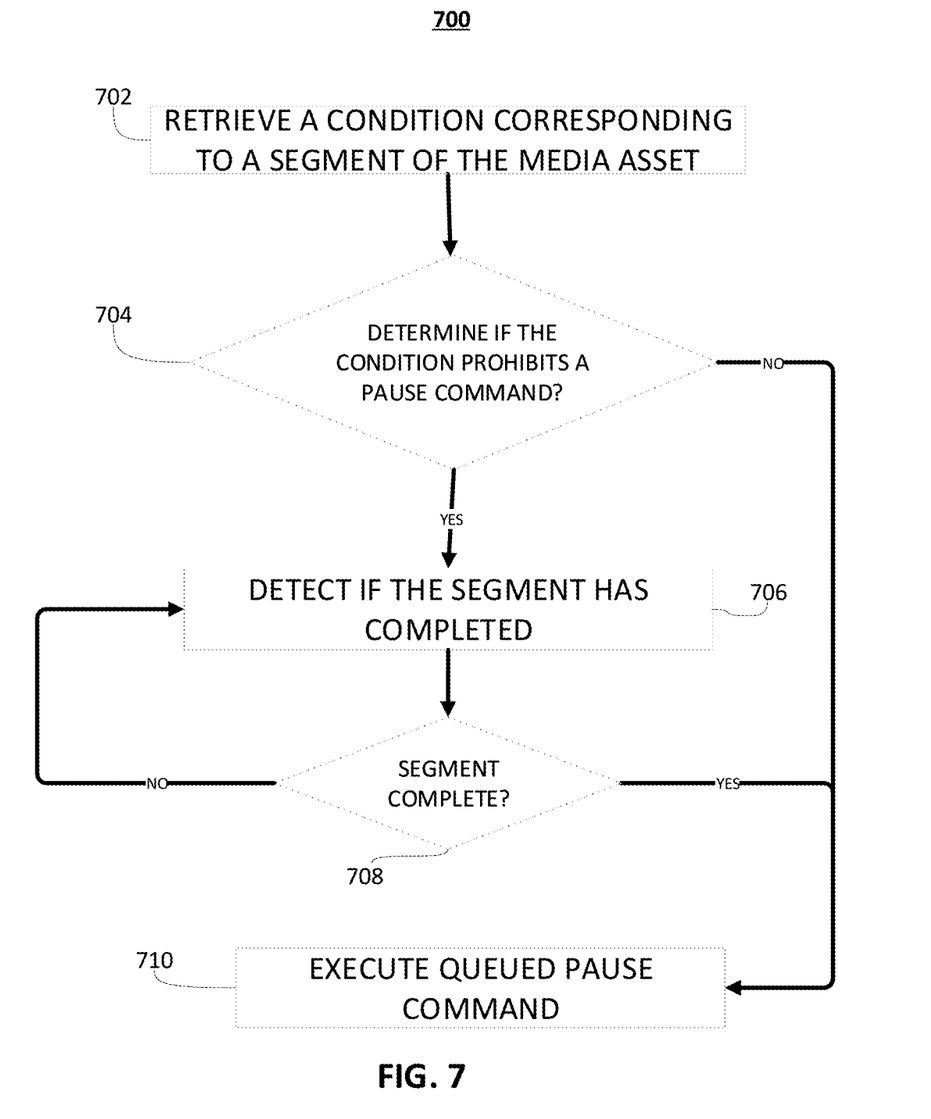
FIG. 7 is an illustrative flowchart of a process for delaying the pause of the play of the media asset, in accordance with embodiments of the disclosure.

FIG. 7 is an illustrative flowchart of a process 700 for delaying the pause of the play of the media asset, in accordance with embodiments of the disclosure.

At 702, the user equipment device 400, by control circuitry 404, receives a condition corresponding to a segment of the media asset using techniques described above.

At 704, the user equipment device 400, by control circuitry 404, determines if the condition prohibits a pause command. In some embodiments, the user equipment device 400 uses a set of rules located in storage 408 to determine if the condition received in step 702 corresponds to prohibiting a pause command. In some embodiments, the condition does not correspond to prohibiting a pause command. In such an embodiment, the user equipment device 400, by control circuitry 404, executes the queued pause command. In some embodiments, the user equipment device 400 uses a trained machine learning model to determine if the condition prohibits a pause command. In some embodiments, the user equipment device 400 uses previous data to determine if the condition prohibits a pause command. For example, if a user equipment device 400 has data indicating that previous segments, which are similar to the current segment, resulted in prohibiting a pause command, the user equipment device 400 can determine that the current segment has a condition that will also prohibit the pause command. If a user equipment device 400 determines that a condition prohibits a pause command, then the process 700 continues to 706.

At 706, the user equipment device 400, by control circuitry 404, detects if the segment has ended. In some embodiments, this detection is made by detecting metadata associated with the content being displayed on the user equipment device 400. In some embodiments, the user equipment device 400 uses pattern recognition techniques to determine if the segment has ended. In some embodiments, the user equipment device 400 uses a trained machine learning model to determine if the segment has completed.

At 708, the user equipment device 400, by control circuitry 404, determines whether a segment has completed, based on the detection in step 706. If the user equipment device 400 detects that the segment has ended, then the user equipment device 400, by control circuitry 404, executes the queued pause command at 710. In an embodiment, if the user device 400 determines that the segment has not completed, based on the detection in step 706, then the process 700 continues to step 706 to detect if the segment has completed. The steps of 706 and 708 continue until the user equipment device 400 determines that the segment has completed. In some embodiments, at 708, after the user equipment device 400 determines that the segment is not completed, the user equipment device 400 delays the process 700 from going to step 706 until after a time period. In some embodiments, the time period is determined by the user equipment device 400 based on the segment. In some embodiments, the time period is a predetermined time period not based on the segment.

At 710, the user equipment device 400, by control circuitry 404, executes the queued pause command. In some embodiments, once the pause command is executed, the user equipment device pauses the play of the media device. In some embodiments, 710 is an output to be sent to one of the devices shown in FIGS. 1-4.

Figure 8:
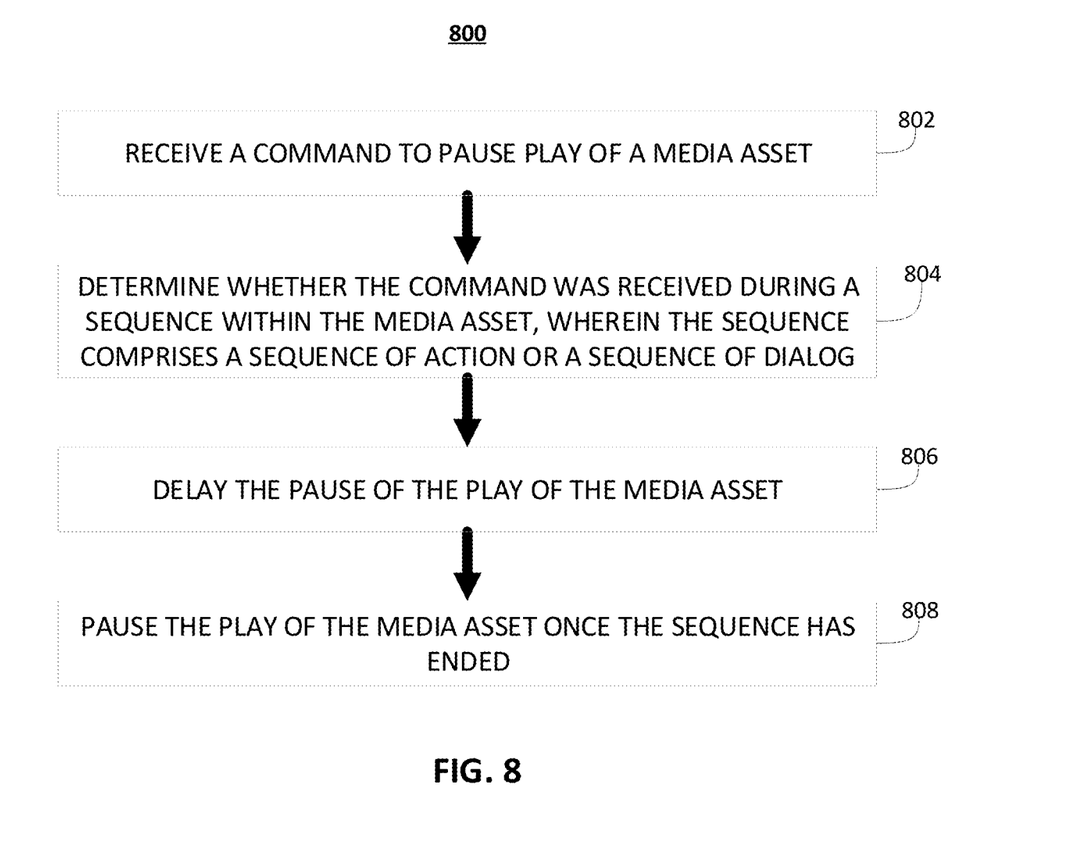
FIG. 8 is an illustrative flowchart of a process for delaying pause of play of a media asset, in accordance with embodiments of the disclosure.

FIG. 8 is an illustrative flowchart of a process 800 for delaying pause of play of a media asset, in accordance with embodiments of the disclosure.

At 802, the user equipment device 400, by control circuitry 404, receives a command to pause play of a media asset. In some embodiments, the user equipment device 400 receives the command when a user presses pause using a button on a remote or on the user equipment device 400. In some embodiments, a user speaks a command into the microphone 416 of the user equipment device 400, and the user equipment device 400 uses natural language processing methods or similar such techniques to determine a pause command.

At 804, the user equipment device 400, by control circuitry 404, determines whether the command was received during a sequence within the media asset, wherein the sequence comprises a sequence of action or a sequence of dialog. In some embodiments, the user equipment device 400 uses the process 900 for determining whether the command was received during a sequence of a media asset as shown in FIG. 9.

At 806, the user equipment device 400, by control circuitry 404, delays the pause of play of the media asset based on the determination in 804. In some embodiments, the user equipment device 400 delays the pause of play based on a condition outputted in 804. In some embodiments, the user equipment device 400 uses a set of rules located in storage 408 to determine if the condition received corresponds to prohibiting a pause command. In some embodiments, the condition does not correspond to prohibiting a pause command. In such an embodiment, the user equipment device 400, by control circuitry 404, executes the queued pause command. In some embodiments, the user equipment device 400 uses a trained machine learning model to determine if the condition prohibits a pause command. In some embodiments, the user equipment device 400 uses previous data to determine if the condition prohibits a pause command. In some embodiments, if a user equipment device 400 determines that a condition prohibits a pause command, then the user equipment device 400 outputs a command to delay pausing of play until the sequence has ended.

At 808, the user equipment device 400, by control circuitry 404, pauses the play of the media asset once the sequence has ended, responsive to the command from 806. In some embodiments, the user equipment device 400, by control circuitry 404, detects if the sequence has ended. In some embodiments, this detection is made by detecting metadata associated with the media asset being displayed on the user equipment device 400. In some embodiments, the user equipment device 400 uses pattern recognition techniques to determine if the sequence has ended. In some embodiments, the user equipment device 400 uses a trained machine learning model to determine if the sequence has ended. If the user equipment device 400 detects that the sequence has ended, then the user equipment device 400, by control circuitry 404, pauses play of the media asset. In an embodiment, if the user device 400 determines that the sequence has not completed, then the user equipment device 400 rechecks, using the techniques described, to determine if the sequence has completed. In some embodiments, the user equipment device 400 continues to recheck until the user equipment device 400 determines that the sequence has completed. In some embodiments, once the user equipment device 400 determines that the sequence is not complete, the user equipment device 400 delays rechecking until after a time period. In some embodiments, the time period is determined by the user equipment device 400 based on the sequence. In some embodiments, the time period is a predetermined time period not based on the sequence.

Figure 9:
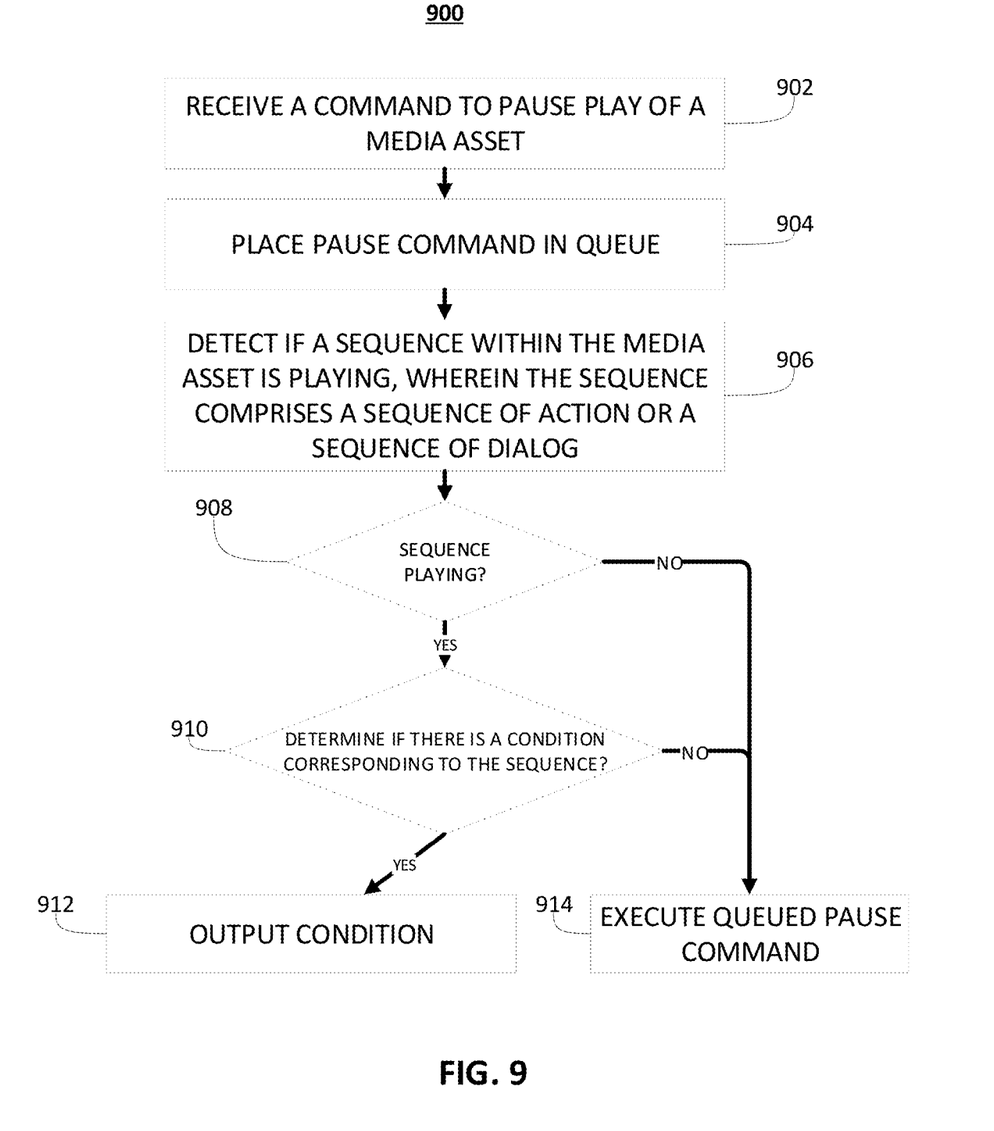
FIG. 9 is an illustrative flowchart of a process for determining whether a command is received during a sequence within the media asset, in accordance with embodiments of the disclosure.

FIG. 9 is an illustrative flowchart of a process 900 for determining whether a command is received during a sequence within the media asset, in accordance with embodiments of the disclosure.

At 902 the user equipment device 400, by control circuitry 404, receives a command to pause play of a media asset using techniques described above.

At 904, the user equipment device 400, by control circuitry 404, places the received pause command in a queue. In some embodiments, the queue is located in any of the devices described in FIGS. 1-4. For example, the queue may be located in storage 408 of the user device.

At 906, the user equipment device 400, by control circuitry 404, detects if a sequence is playing when the command was received by the user equipment device 400. In some embodiments, this detection is made by using any of the methods described above, for example, detection of metadata, use of pattern recognition techniques, use of a trained machine learning model, similar such methods, or any combination thereof.

At 908, the user equipment device 400, by control circuitry 404, determines whether a sequence is playing when the command was received by the user equipment device 400, based on the detection in step 906. If no sequence is detected, then the user equipment device 400, by control circuitry 404, executes the queued pause command at 914. If a sequence is detected, then the process 900 continues to 910.

At 910, the user equipment device 400, by control circuitry 404, determines if there is a condition corresponding to the sequence. If no condition is detected, then the user equipment device 400, by control circuitry 404, executes the queued pause command at 914. In some embodiments, the user equipment device 400 uses a set of rules located in storage 408 to determine if the sequence detected in step 906 corresponds to a condition. For example, a rule may be that if a sequence including a pivotal plot element is playing, then pause commands are prohibited until after the detected sequence. In some embodiments, no condition corresponds to the sequence. In such an embodiment, the user equipment device 400, by control circuitry 404, executes the queued pause command at 914. In some embodiments, the user equipment device 400 uses a trained machine learning model to determine if there is a condition corresponding to the sequence. In some embodiments, the user equipment device 400 uses previous data to determine if there is a condition associated with the detected sequence. If a condition is detected, then the process 900 continues to 912.

At 912, the user equipment device 400, by control circuitry 404, outputs a condition associated with the sequence.

In some embodiments, there may be more than one condition. In an embodiment, a condition may be to seek revalidation of a pause command before executing pause.

At 914, the user equipment device 400, by control circuitry 404, executes the queued pause command. In some embodiments, once the pause command is executed, the user equipment device pauses the play of the media device. In some embodiments 914 is an output to be sent to one of the devices shown in FIGS. 1-4.

It is contemplated that some suitable steps or suitable descriptions of FIGS. 5-9 may be used with other suitable embodiments of this disclosure. In addition, some suitable steps and descriptions described in relation to FIGS. 5-9 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-4 could be used to perform one or more of the steps in FIGS. 5-9.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for delaying pause, the method comprising using processing circuitry for:
   receiving a command from a user on a first device, to pause playing of a media asset;
   determining, based on accessing metadata of the media asset, that the command was received at a time when dialog is being generated for output by the playing of the media asset;
   identifying, by the first device, a first condition stored in memory of the first device, wherein the first condition indicates that commands received when dialog is being generated for output by the playing of the media asset should be delayed;
   responsive to the determining the command was received at a time when dialog is being generated for output by the playing of the media asset and identifying the first condition, storing the command in a queue, wherein the queue is located in the memory of the first device;
   determining, based on accessing the metadata of the media asset, that the dialog being generated for output by the playing of the media asset has concluded;
   responsive to the determining that the dialog being generated for output has concluded, executing, by the first device, the command pausing the play of the media asset.

2. The method of claim 1, further comprising generating for output a message to the user indicating that the media asset will pause once the dialog being generated for output by the playing of the media asset has completed.

3. The method of claim 2, wherein the output message displays the amount of time until the play of the media asset will be paused.

4. The method of claim 1, further comprising providing the user with an option to override delaying the pause of play.

5. The method of claim 1 further comprising, providing the user with an option to further delay the pausing of the play of the media asset according to a time period selected by the user.

6. The method of claim 1 further comprising, determining, based on accessing metadata of the media asset, that the command was received during a sequence of the media asset involving a character death, wherein the first condition further indicates that commands received during sequences of the media asset involving one or more character deaths should be delayed.

7. An apparatus comprising:
control circuitry; and
at least one memory including computer program code for one or more programs, the at least one memory and the computer program code configured to, with the control circuitry, cause the apparatus to perform at least the following:
receive a command from a user to pause playing of a media asset;
determine, based on accessing metadata of the media asset, that the command was received at a time when dialog is being generated for output by the playing of the media asset;
identify a first condition stored in the at least one memory of the first device, wherein the first condition indicates that commands received when dialog is being generated for output by the playing of the media asset should be delayed;
responsive to the determining the command was received at a time when dialog is being generated for output by the playing of the media asset and identifying the first condition, store the command in a queue, wherein the queue is located in the at least one memory of the first device;
determine, based on accessing the metadata of the media asset, that the dialog being generated for output by the playing of the media asset has concluded;
responsive to the determining that the dialog being generated for output has concluded, execute the command to pause the play of the media asset.

8. The apparatus of claim 7, wherein the apparatus is further caused to generate for output a message to the user indicating that the media asset will pause once the dialog being generated for output by the playing of the media asset has completed.

9. The apparatus of claim 8, wherein the output message displays the amount of time until the play of the media asset will be paused.

10. The apparatus of claim 7, wherein the apparatus is further caused to provide the user with an option to override the delaying of the pause of play.

11. The apparatus of claim 7, wherein the apparatus is further caused to provide the user with an option to further delay the pausing of the play of the media asset according to a time period selected by the user.

12. A system for delaying pause, the system comprising:
means for receiving a command from a user on a first device, to pause playing of a media asset;
means for determining, based on accessing metadata of the media asset, that the command was received at a time when dialog is being generated for output by the playing of the media asset;
means for identifying, by the first device, a first condition stored in memory of the first device, wherein the first condition indicates that commands received when dialog is being generated for output by the playing of the media asset should be delayed;
means for storing, responsive to the determining the command was received at a time when dialog is being generated for output by the playing of the media asset and identifying the first condition, the command in a queue, wherein the queue is located in the memory of the first device;
means for determining, based on accessing the metadata of the media asset, that the dialog being generated for output by the playing of the media asset has concluded;
means for executing, responsive to the determining that the dialog being generated for output has concluded, the command pausing the play of the media asset.

13. The system of claim 12, further comprising means for generating for output a message to the user indicating that the media asset will pause once the dialog being generated for output by the playing of the media asset has completed.

14. The system of claim 13, wherein the output message displays the amount of time until the play of the media asset will be paused.

15. The system of claim 12, wherein the control circuitry is further configured to provide the user with an option to override delaying the pause of play.

16. The system of claim 12, further comprising means for providing the user with an option to further delay the pausing of the play of the media asset according to a time period selected by the user.

* * * * *